United States Patent
Kaida

(10) Patent No.: US 11,568,517 B2
(45) Date of Patent: Jan. 31, 2023

(54) ELECTRONIC APPARATUS, CONTROL METHOD, AND NON- TRANSITORY COMPUTER READABLE MEDIUM

(71) Applicant: CANON KABUSHIKI KAISHA, Tokyo (JP)

(72) Inventor: Hironori Kaida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 80 days.

(21) Appl. No.: 17/197,438

(22) Filed: Mar. 10, 2021

(65) Prior Publication Data

US 2021/0287343 A1    Sep. 16, 2021

(30) Foreign Application Priority Data

Mar. 11, 2020   (JP) .............................. JP2020-041760

(51) Int. Cl.
| | |
|---|---|
| *G06T 5/00* | (2006.01) |
| *G06T 7/536* | (2017.01) |
| *H04N 5/262* | (2006.01) |
| *H04N 5/232* | (2006.01) |
| *H04N 5/235* | (2006.01) |
| *G06V 40/16* | (2022.01) |

(52) U.S. Cl.
CPC .............. *G06T 5/002* (2013.01); *G06T 7/536* (2017.01); *G06V 40/161* (2022.01); *H04N 5/2351* (2013.01); *H04N 5/23219* (2013.01); *H04N 5/232125* (2018.08); *H04N 5/2621* (2013.01)

(58) Field of Classification Search
None
See application file for complete search history.

(56) References Cited

U.S. PATENT DOCUMENTS

2012/0105590 A1 *    5/2012   Fukumoto ..........  H04N 5/23216
                                                              348/46

FOREIGN PATENT DOCUMENTS

| | | | |
|---|---|---|---|
| JP | 2009-278623 A | | 11/2009 |
| JP | 2010093422 A | * | 4/2010 |

(Continued)

OTHER PUBLICATIONS

English translation of KR-20150144543-A, Dec. 2015 Ha Ho (Year: 2015).*

(Continued)

*Primary Examiner* — James M Hannett

(74) *Attorney, Agent, or Firm* — Cowan, Liebowitz & Latman, P.C.

(57) ABSTRACT

An electronic apparatus according to the present invention, includes at least one memory and at least one processor which function as: an acquisition unit configured to acquire positional information indicating a position of an object in a captured image; a display control unit configured to perform control such that an item having a length in a first direction, which corresponds to a range in a depth direction in the image, is displayed in a display, and a graphic indicating presence of the object is displayed in association with a position corresponding to the positional information in the item; a reception unit configured to be able to receive an operation of specifying a set range which is at least part of the item; and a processing unit configured to perform predetermined processing based on the set range.

13 Claims, 14 Drawing Sheets

(56) References Cited

FOREIGN PATENT DOCUMENTS

| JP | 2010177741 | A | * | 8/2010 |
| JP | 2014078826 | A | * | 5/2014 |
| KR | 20150144543 | A | * | 12/2015 |

OTHER PUBLICATIONS

English translation of JP-2014078826-A, May 2014 Minoshima T (Year: 2014).*
English translation of JP-2010177741-A , Aug. 2010 Arai (Year: 2010).*
English translation of JP-2010093422-A, Apr. 2010, Shimma (Year: 2010).*

* cited by examiner

FIG. 9A
| 1/9 | 1/9 | 1/9 |
|---|---|---|
| 1/9 | 1/9 | 1/9 |
| 1/9 | 1/9 | 1/9 |
FIG. 9B
| 1/25 | 1/25 | 1/25 | 1/25 | 1/25 |
|---|---|---|---|---|
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |
FIG. 10A
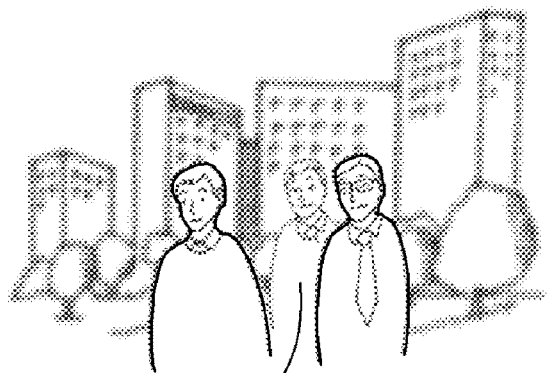
1001
FIG. 10B
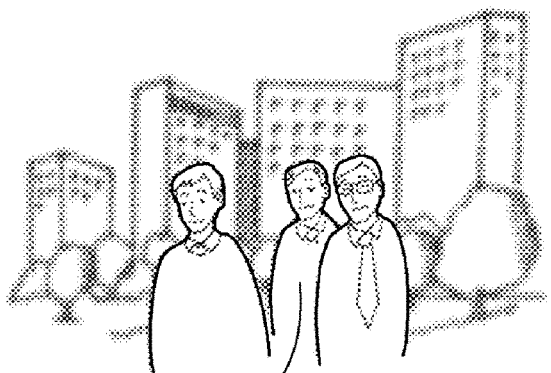
1002

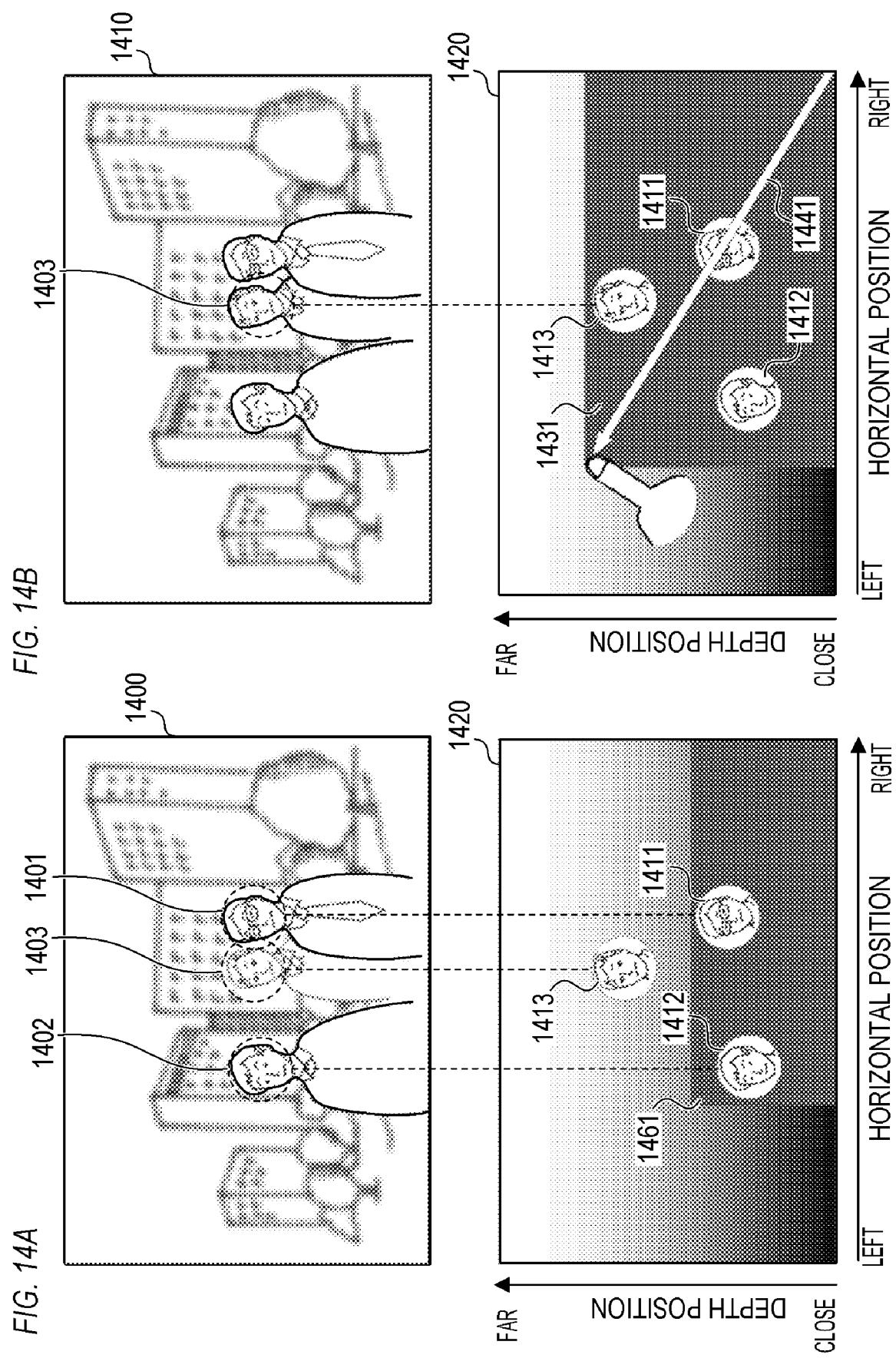

ELECTRONIC APPARATUS, CONTROL METHOD, AND NON- TRANSITORY COMPUTER READABLE MEDIUM

BACKGROUND OF THE INVENTION

Field of the Invention

The present invention relates to an electronic apparatus, and particularly relates to processing (control) which uses at least part of a range in a depth direction in a captured image.

Description of the Related Art

In recent years, in smartphones, image processing such as background blurring processing is performed on an image that has been taken (recorded). In the background blurring processing, by blurring an object other than a main object (primary object), i.e., blurring an object used as a background, it is possible to generate an image similar to an image having a shallow depth of field (blurred background) which is taken by a digital single-lens (reflex) camera.

In the background blurring processing, the object other than the main object is blurred, hence, main object detection processing for detecting the main object is necessary. In the main object detection processing, the main object and other objects are identified based on a characteristic amount of an image. However, depending on the characteristic amount of the image, there is a case where the object is erroneously identified and the edge of the object is erroneously detected. In addition, in a case where the main object is not detected accurately, even the main object is blurred, and an image which has failed in the background blurring processing is generated.

For example, in an image, in which a person who is positioned far away from a smartphone that photographs the same, is captured, the size of the person is small in the image, and hence there may be a case where the person is erroneously identified (recognized) as part of a background rather than a main object, and the image in which the person is blurred is generated.

Japanese Patent Application Publication No. 2009-278623 discloses a technique in which a user specifies a specific element (object) on a displayed image, an area of the specific element is automatically determined by segmentation, and image editing processing is performed on the determined area.

According to the technique disclosed in Japanese Patent Application Publication No. 2009-278623, the area of the object specified by the user is automatically determined by the segmentation in accordance with the characteristic amount of the image. However, in some cases, such as a case where the characteristic amount of the object specified by the user is similar to the characteristic amount of its background, an area intended by the user is not necessarily determined.

SUMMARY OF THE INVENTION

The present invention provides a technique for allowing a user to easily specify a desired area of an object such that desired processing (control) is executed.

An electronic apparatus according to the present invention, includes at least one memory and at least one processor which function as: an acquisition unit configured to acquire positional information indicating a position of an object in a captured image; a display control unit configured to perform control such that an item having a length in a first direction, which corresponds to a range in a depth direction in the image, is displayed in a display, and a graphic indicating presence of the object is displayed in association with a position corresponding to the positional information in the item; a reception unit configured to be able to receive an operation of specifying a set range which is at least part of the item; and a processing unit configured to perform predetermined processing based on the set range.

Further features of the present invention will become apparent from the following description of exemplary embodiments with reference to the attached drawings.

BRIEF DESCRIPTION OF THE DRAWINGS

FIGS. 9A and 9B are each a view showing an example of a smoothing filter according to Embodiment 1;

FIGS. 10A and 10B are each a view showing an example of a result of blurring processing according to Embodiment 1;

FIGS. 14A and 14B are each a view showing an example of a display according to Embodiment 2.

DESCRIPTION OF THE EMBODIMENTS

Embodiment 1

Figure 1A:
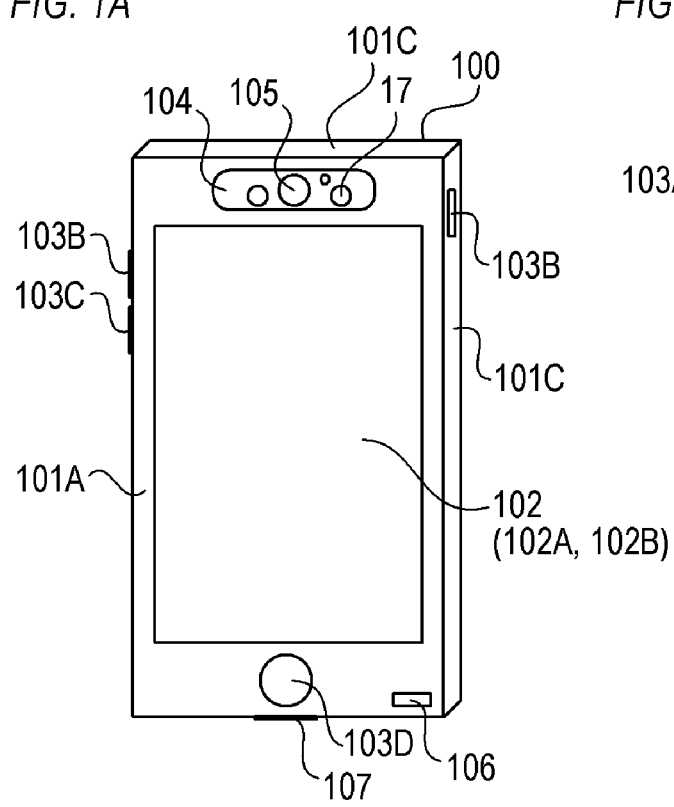
FIGS. 1A and 1B are external views of a smartphone according to Embodiment 1.
Figure 1B:
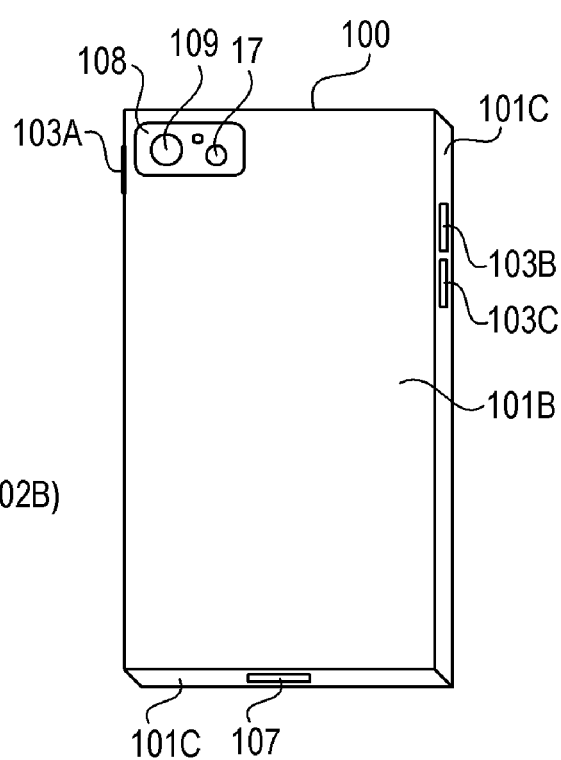

Hereinbelow, Embodiment 1 of the present invention will be described. FIGS. 1A and 1B show the outer appearance of a smartphone (smartphone with a camera; cellular phone unit) 100 serving as an example of an electronic apparatus to which the present invention is applied. FIG. 1A is a front perspective view of the smartphone 100, and FIG. 1B is a rear perspective view of the smartphone 100.

The smartphone 100 has a vertically long shape. On a front face (front surface) 101A of the smartphone 100, a touch-screen display 102, a button 103D, a front camera 104, an illuminance sensor 105, and a speaker 106 are disposed. On a back face (back surface) 101B of the smartphone 100, a rear camera 108 and a light 109 are disposed. On side faces (side surfaces) 101C of the smartphone 100, buttons 103A to 103C and a connector 107 are disposed.

The button 103A is a power button, and it is possible to set or cancel the sleep mode of the smartphone 100 by pressing the button 103A. Further, it is possible to turn ON/OFF the smartphone 100 by pressing and holding down the button 103A. The button 103B is a shutter button, and is disposed at a position where the button 103B is easily pressed in a state in which the smartphone 100 is held laterally. There are cases where the shutter button (an item having the function of the shutter button) is displayed in the touch-screen display 102. The button 103C is a mute button, and is used when ON (ringing)/OFF (mute) switching of output of sounds such as a shutter sound and a warning sound output from the speaker 106 is performed. The button 103D is a home button, and is used when a home screen is displayed in the touch-screen display 102. It is also possible to cancel the sleep mode of the smartphone 100 by using the button 103D instead of the button 103A. A user can assign any function to the button 103D. In the following description, there are cases where the button is not identified as one of the buttons 103A to 103D, and the buttons 103A to 103D are collectively referred to as the button 103 capable of receiving an operation by the user.

The touch-screen display 102 includes a liquid crystal display 102A and a touch screen 102B. The touch screen 102B detects contact of an operating body such as a finger or a stylus pen with the touch screen 102B. Further, the touch screen 102B can detect contact with a plurality of parts of the touch screen 102B, e.g., contact of a plurality of fingers with the touch screen 102B. As a detection method in the touch screen 102B, for example, a capacitance method or a resistive film method is used.

In the smartphone 100, the type of a gesture operation is determined based on the contact detected by the touch screen 102B, a contact position, and a contact time period. The gesture operation is an operation performed on the touch screen 102B by the operating body. Examples of the gesture operation determined in the smartphone 100 (the gesture operation which can be received by the smartphone 100) include a touch, a release, a tap, a drag, a swipe, a flick, a pinch-in, and a pinch-out. In the smartphone 100, processing (control) corresponding to the gesture operation performed on the touch screen 102B is performed.

The touch is the gesture operation in which the operating body comes into contact with the touch screen 102B. The release is the gesture operation in which the operating body moves away from the touch screen 102B. The tap is the gesture operation in which, after the touch on the touch screen 102B, the release from the touch screen 102B is quickly performed. The drag is the gesture operation in which an object displayed in the liquid crystal display 102A is long-pressed and dragged in a state in which the operating body is in contact with the touch screen 102B. The swipe is the gesture operation in which the operating body is moved so as to slide on the touch screen 102B in a state in which the operating body is in contact with the touch screen 102B. A linear swipe can be said to be a slide. The flick is the gesture operation in which, after the touch on the touch screen 102B, the release from the touch screen 102B is performed such that the touch screen 102B is flicked with the operating body. The pinch-in is the gesture operation in which a plurality of operating bodies (a plurality of fingers) are moved on the touch screen 102B such that the touch screen 102B is pinched (the space between the fingers is reduced). The pinch-out is the gesture operation in which a plurality of operating bodies are moved on the touch screen 102B such that the plurality of operating bodies are spread.

Figure 2:
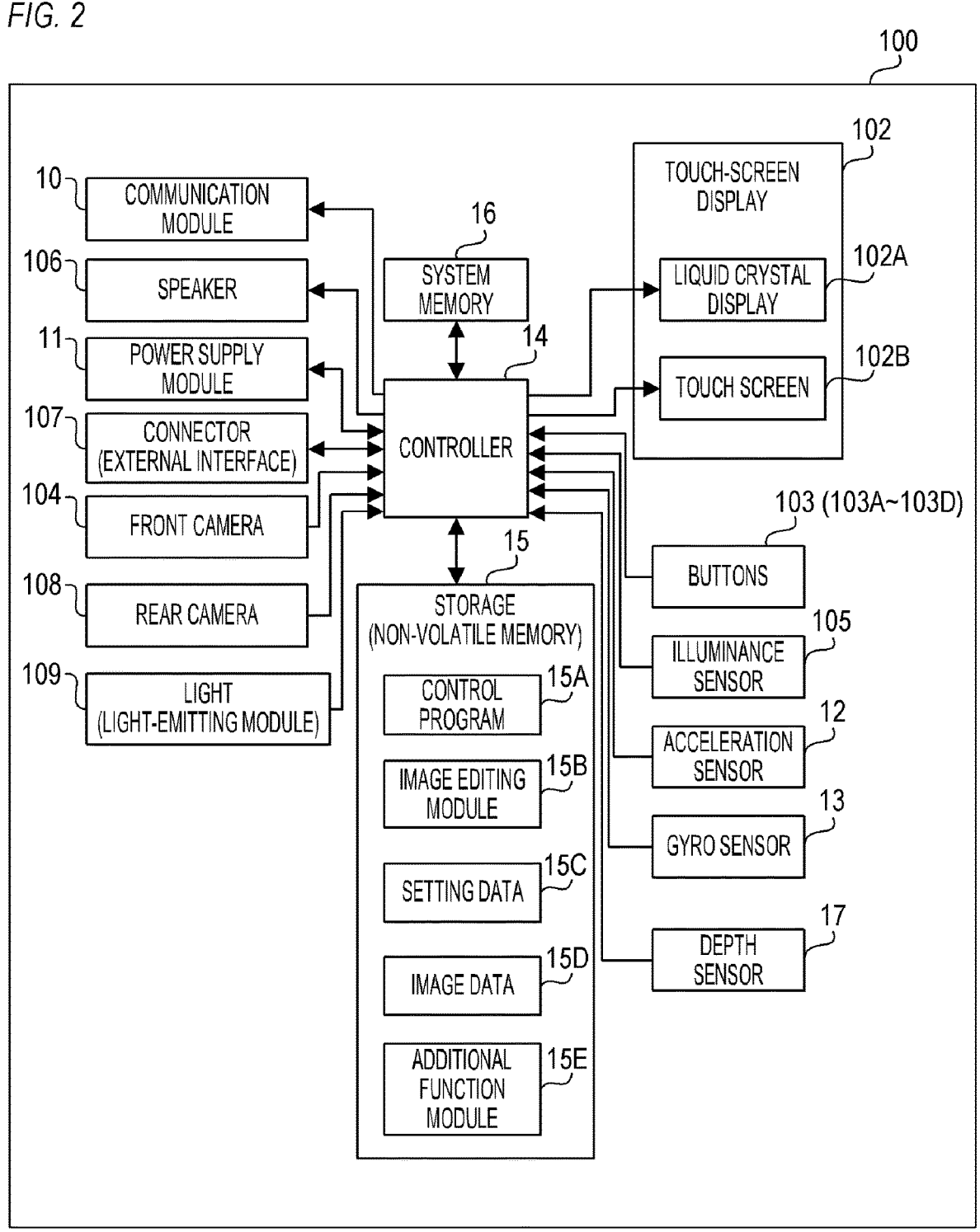
FIG. 2 is a block diagram showing an example of the configuration of the smartphone according to Embodiment 1.

FIG. 2 is a block diagram showing an example of the configuration of the smartphone 100.

As described above, the smartphone 100 includes the touch-screen display 102, and the touch-screen display 102 includes the liquid crystal display 102A and the touch screen 102B. The liquid crystal display 102A displays letters, images, and icons according to display control of a controller 14. The touch screen 102B detects the gesture operation.

The front camera 104 includes a lens, and an imaging device such as a CCD or a CMOS which converts an optical image to an electrical signal. The front camera 104 is a small camera module including an autofocus (AF), a diaphragm, and a shutter speed adjustment function. The front camera 104 images an object which faces the front face 101A.

The illuminance sensor 105 detects brightness around the smartphone 100, specifically, the illuminance of light (ambient light; natural light) applied to the smartphone 100. The controller 14 sets imaging conditions of the front camera 104 and the rear camera 108 (imaging parameters) and adjusts the luminance of the liquid crystal display 102A based on the detected illuminance.

In the case where the output of sounds is set to ON (ringing), the speaker 106 outputs sounds such as the shutter sound and the warning sound. For example, the speaker 106 outputs the shutter sound when photographing is executed.

The connector 107 is used for connection between the smartphone 100 and an external apparatus. For example, to the connector 107, an AC adaptor for charging a battery provided in a power supply module 11 is connected. Further, the connector 107 is used when input and output of image data and sound data are performed with a storage 15. The connector 107 may be a terminal designed exclusively for the smartphone 100 such as a Dock connector, or may also be a general-purpose terminal such as a universal serial bus (USB).

The rear camera 108 is a small camera module similar to the front camera 104. The rear camera 108 images an object which faces the back face 101B. The light 109 is a light-emitting module, and functions as a flash when imaging by the rear camera 108 is performed.

A communication module 10 performs communication according to a predetermined wireless communication standard. For example, the communication module 10 supports at least one of the IEEE 802.11 standard (so-called Wi-Fi), Bluetooth (registered trademark), and NFC. The communication module 10 is used when input and output of image data obtained by imaging and download of a function addition program module to the smartphone 100 are performed.

The power supply module 11 includes a rechargeable battery, and supplies power (electric power) to the entire smartphone 100. As the battery provided in the power supply module 11, for example, a lithium-ion battery or a nickel metal hydride battery is used. The battery is charged by the AC adaptor via the connector 107 or another USB-connected external apparatus.

An acceleration sensor 12 detects the direction and magnitude of acceleration acting on the smartphone 100. The acceleration sensor 12 can detect the magnitude of the acceleration in each of three axial directions including X, Y, and Z directions. A gyro sensor 13 detects the angle (attitude) and angular velocity of the smartphone 100. A depth sensor 17 measures a distance from the camera (the front camera 104 or the rear camera 108) to an object to be photographed. A method for measuring the distance includes a method in which any of infrared rays, light, and a supersonic wave is emitted and is reflected by an object, and a time period required for the emitted infrared rays, light, or supersonic wave to return to where it is emitted from its reflection is measured. In addition, an image sensor used in a camera or the like may be used as the depth sensor 17. In this case, there is a method in which a plurality of cameras arranged in parallel are provided, and a distance to an object is acquired (calculated) from a plurality of captured images (parallax image). In addition, the distance may be acquired by providing a micro lens in a pixel portion of an image sensor, and acquiring a plurality of parallax images. The image sensor at this point may be separately provided as the depth sensor 17, or the image sensor of the rear camera 108 may be caused to function as the depth sensor 17. In particular, some smartphones produced in recent years have a plurality of cameras and, in this case, it is possible to acquire the distance by using images captured by the plurality of cameras.

The controller 14 is a processor such as a general-purpose CPU or a one-chip system (system-on-a-chip (SoC)) designed for the smartphone 100. The controller 14 controls the entire smartphone 100. The controller 14 implements processing related to flowcharts described later by loading a control program 15A stored in the storage 15 into a system memory 16 and executing the control program 15A. The system memory 16 is used also as a work area of the controller 14. The system memory 16 is, e.g., a RAM.

The storage 15 is a semiconductor memory, and is, e.g., an electrically erasable/recordable non-volatile memory (flash ROM or the like). In the storage 15, the control program 15A and various pieces of data are stored (recorded). In FIG. 2, the control program 15A, an image editing module 15B, setting data 15C, image data 15D, and an additional function module 15E are stored in the storage 15. The control program 15A and various pieces of data stored in the storage 15 may be input by wireless communication by the communication module 10, or may also be input via the connector 107. The storage 15 may or may not be detachable from the smartphone 100.

The control program 15A provides a function for controlling the entire smartphone 100. That is, the controller 14 controls each block shown in FIG. 2 according to the control program 15A. For example, the controller 14 provides a camera function by controlling the touch-screen display 102, the button 103, the front camera 104, the illuminance sensor 105, the rear camera 108, and the light 109 according to the control program 15A. Further, the controller 14 executes processing based on the gesture operation detected by the touch screen 102B according to the control program 15A, and displays information corresponding to the result of execution of the processing in the liquid crystal display 102A. The control program 15A may be used in combination with other programs (modules) stored in the storage 15.

The image editing module 15B is a module which provides a function for editing and managing image data obtained by imaging. The setting data 15C is data related to various operations (various settings) in the smartphone 100, and is data related to, e.g., the setting of various modules. The image data 15D includes image data captured by the front camera 104, and image data captured by the rear camera 108. The additional function module 15E is a module which provides a function added to the smartphone 100. For example, the additional function module 15E provides a browser function for displaying WEB pages.

Figure 3:
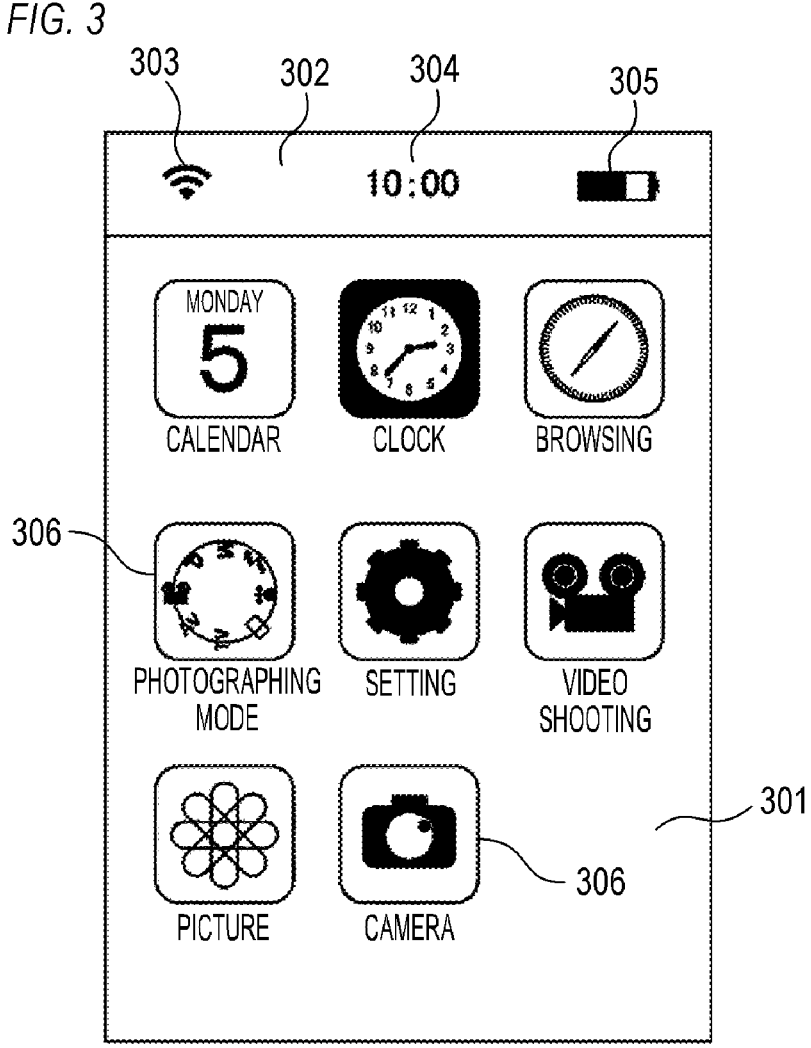
FIG. 3 is a view showing an example of a menu screen according to Embodiment 1.

FIG. 3 is a view showing an example of a menu screen displayed in the liquid crystal display 102A. The menu screen in FIG. 3 has a menu area 301 and a status display area 302.

The menu area 301 is an area for the user to select a function to be executed from among a plurality of functions of the smartphone 100. In the menu area 301, a plurality of icons 306 are displayed, and the plurality of icons 306 are associated with the plurality of functions of the smartphone 100. When the controller 14 detects the tap on the icon 306, the controller 14 executes the function associated with the icon 306. FIG. 3 displays eight icons 306 associated with eight functions of a calendar, a clock, browsing, an imaging mode, setting, video shooting, a picture, and a camera.

The status display area 302 is an area for displaying various statuses of the smartphone 100. In FIG. 3, the status display area 302 is positioned above the menu area 301, and a level icon 303 indicating Wi-Fi strength, time 304, and a battery icon 305 indicating a remaining battery level are displayed in the status display area 302. The status display area 302 is used also as an area for displaying various notification messages.

Figure 4:
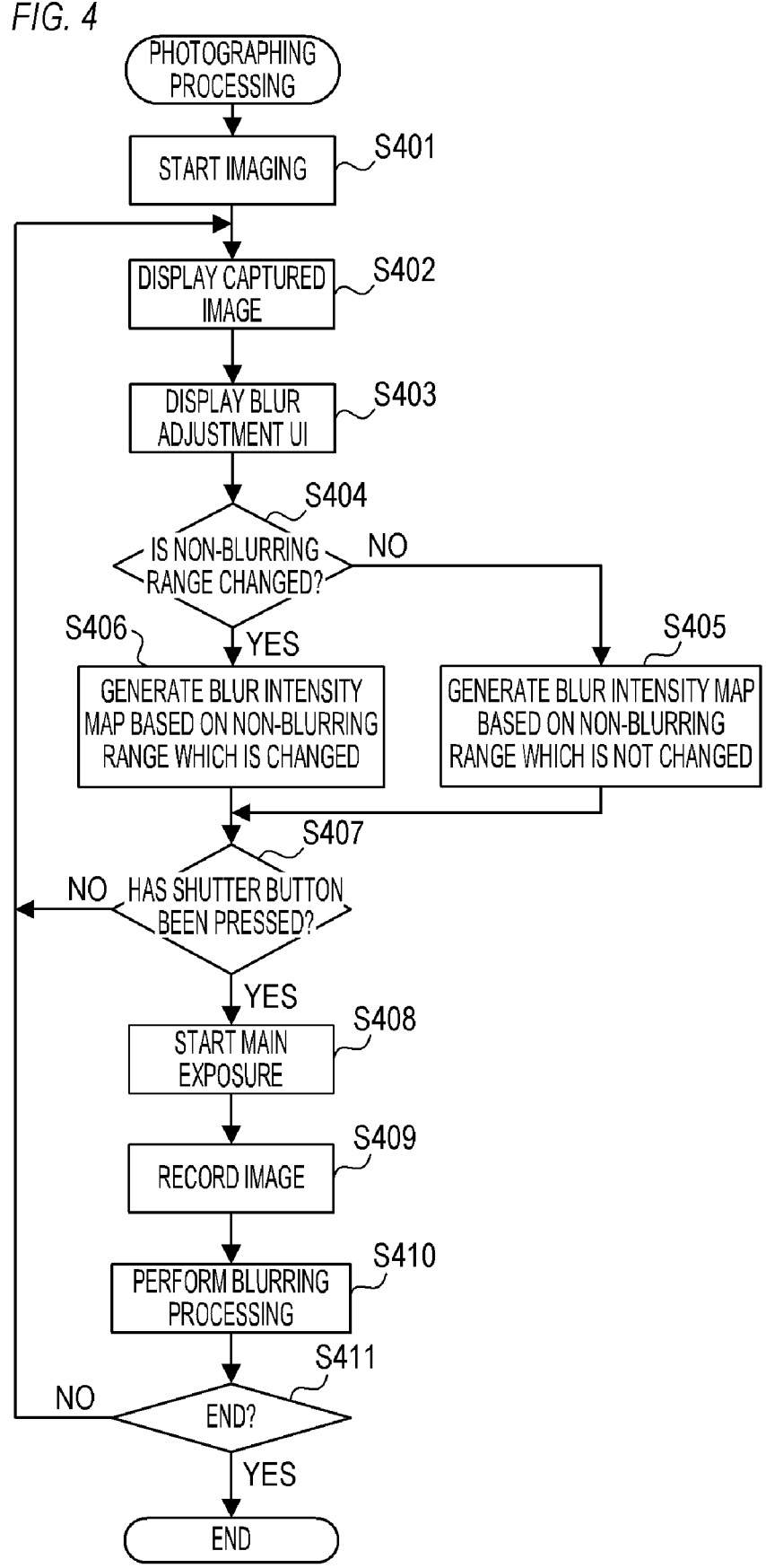
FIG. 4 is a flowchart of photographing processing according to Embodiment 1.

FIG. 4 is a flowchart showing the detail of photographing processing (photographing processing including image editing processing) performed in the smartphone 100. The controller 14 loads the control program 15A stored in the storage 15 into the system memory 16 and executes the control program 15A, and the above processing is thereby implemented. For example, when the tap on, among the plurality of icons 306 in FIG. 3, the icon 306 associated with the function of the camera (camera function) is performed, the processing in FIG. 4 is started.

In S401, the controller 14 activates the camera function and starts imaging. Although imaging by the front camera 104 may be started, imaging by the rear camera 108 is started. Further, the controller 14 drives the depth sensor 17 to start acquisition of depth information indicating a depth range (a range in a depth direction) in a captured image and a distance from the smartphone 100 to an object (positional information indicating the position of the object in the captured image).

In S402, the controller 14 displays the image captured by the rear camera 108 in the liquid crystal display 102A In S403, the controller 14 displays a blur adjustment UI in the liquid crystal display 102A.

Figure 5:
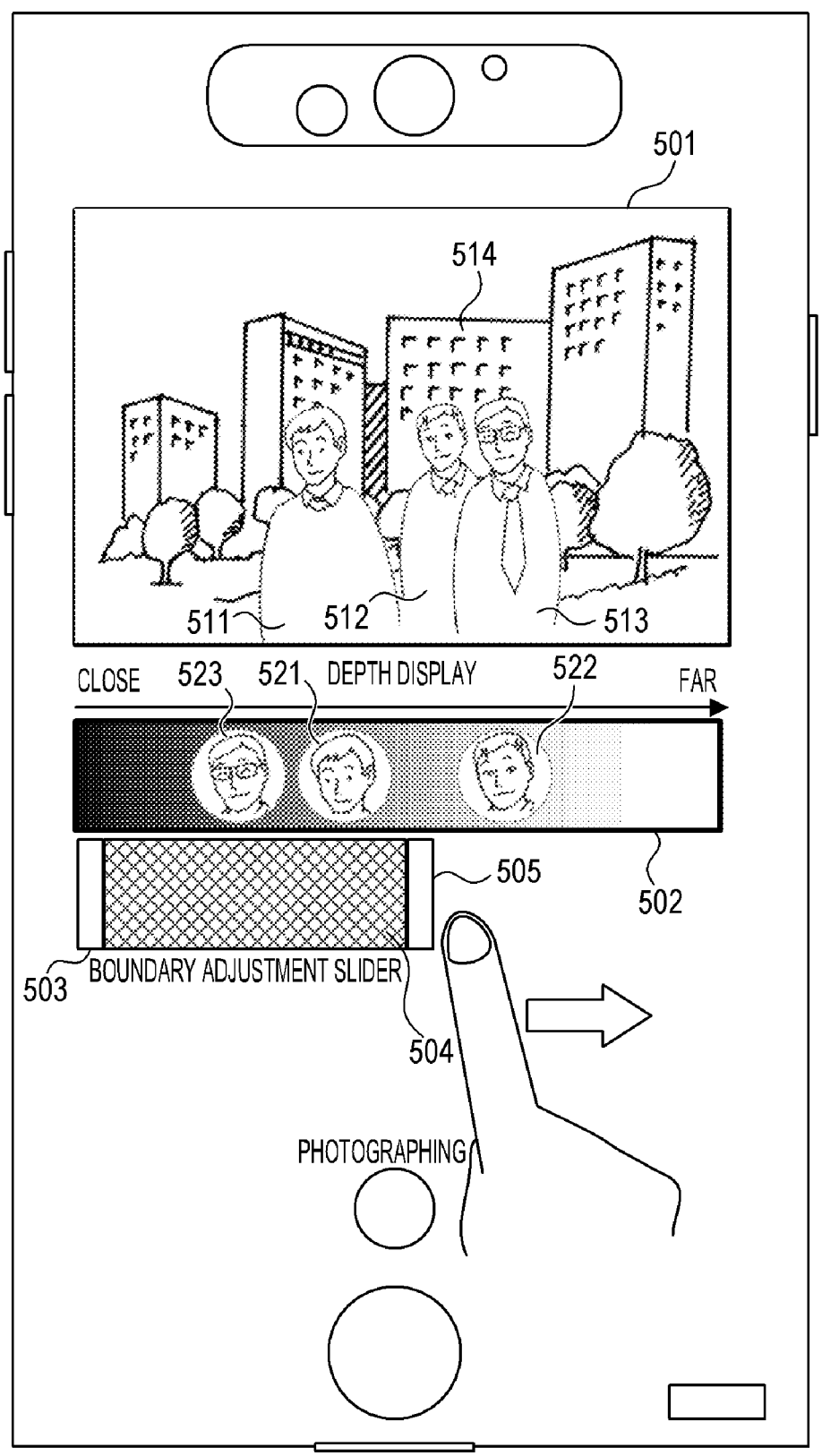
FIG. 5 is a view showing an example of a display according to Embodiment 1.

FIG. 5 is a view showing an example of a display of the captured image and the blur adjustment UI. In an area 501, the image captured by the rear camera 108 is displayed. The blur adjustment UI includes a depth map (depth bar) 502, boundary adjustment sliders 503 and 505, and object icons 521 to 523.

The depth map 502 is an item (graphic) displayed based on the depth information, and the length of the depth map 502 in a lateral direction corresponds to the depth range in the captured image (the image displayed in the area 501). Consequently, the depth map 502 indicates the depth range in the captured image (the image displayed in the area 501). In the depth map 502, the distance (depth) from the smartphone 100 is expressed by using luminance. Specifically, in the depth map 502, the luminance differs according to a position in the lateral direction such that the depth map 502 becomes darker as the depth becomes smaller and the depth map 502 becomes lighter as the depth becomes larger. Note that, in the depth map 502, it is only required that the depth is visually indicated, and hence at least either the luminance or color may differ according to, e.g., the position in the lateral direction. Specifically, in the depth map 502, a small depth may be expressed by using blue, a medium depth may be expressed by using purple, and a large depth may be expressed by using red.

Each of the object icons 521 to 523 is a graphic (icon; item) displayed based on the positional information of the object. Each of the object icons 521 to 523 indicates the present of the object in the captured image (the image displayed in the area 501). Specifically, the object icon 521 indicates the presence of an object 511, the object icon 522 indicates the presence of an object 512, and the object icon 523 indicates the presence of an object 513. In FIG. 5, based on the positional information (the position in the depth direction) of the corresponding object, each of the object icons 521 to 523 is displayed at a position (corresponding position) corresponding to the positional information in the depth map 502. Accordingly, the blur adjustment UI can be said to be information in which the depth information of the captured image and the positional information of the object are associated with each other.

The user can easily understand that, among the objects 511 to 513, the object 513 is closest to the smartphone 100 and the object 512 is farthest from the smartphone 100 by looking at the depth map 502 and the object icons 521 to 523.

In Embodiment 1, it is assumed that the controller 14 performs main object detection processing by using the image editing module 15B, and displays a face icon of the detected main object (primary object) as the object icon. In FIG. 5, a background object 514 is not detected as the main object, and hence the object icon of the object 514 is not displayed, but it is also possible to display the object icon corresponding to the background object.

Note that the object icon does not need to be the face icon (face image) as long as the corresponding object can be determined, and may include a character string and an arrow. In addition, the main object does not need to be a person. The object icon of each object may be displayed without performing the main object detection processing. It is only required that the object icon is displayed in association with the corresponding position in the depth map 502 (in the item), and the object icon does not need to be displayed in the depth map 502. For example, the object icon may be displayed outside the depth map 502 such that the corresponding position is indicated.

Each of the boundary adjustment sliders 503 and 505 is an item (graphic) for the user to specify a set range which is at least part of the depth map 502. In Embodiment 1, a range in the lateral direction is specified as the set range by using the boundary adjustment sliders 503 and 505. Consequently, the set range can be said to be at least part of the depth range in the captured image (the image displayed in the area 501). Specifically, positions (positions in the lateral direction) of the boundary adjustment sliders 503 and 505 can be changed by the operations such as the drag, the swipe, and the slide. In an area from the boundary adjustment slider 503 to the boundary adjustment slider 505, a set range bar (graphic, item) 504 which occupies the area is displayed. A range in the depth map 502 matching the range of the set range bar 504 (the range in the lateral direction) is used as the set range.

In Embodiment 1, the depth range used as the range of the main object is specified by using the boundary adjustment sliders 503 and 505, and an area which does not correspond to the specified depth range (set range) in the captured image (the image displayed in the area 501) is blurred by blurring processing.

Figure 6:
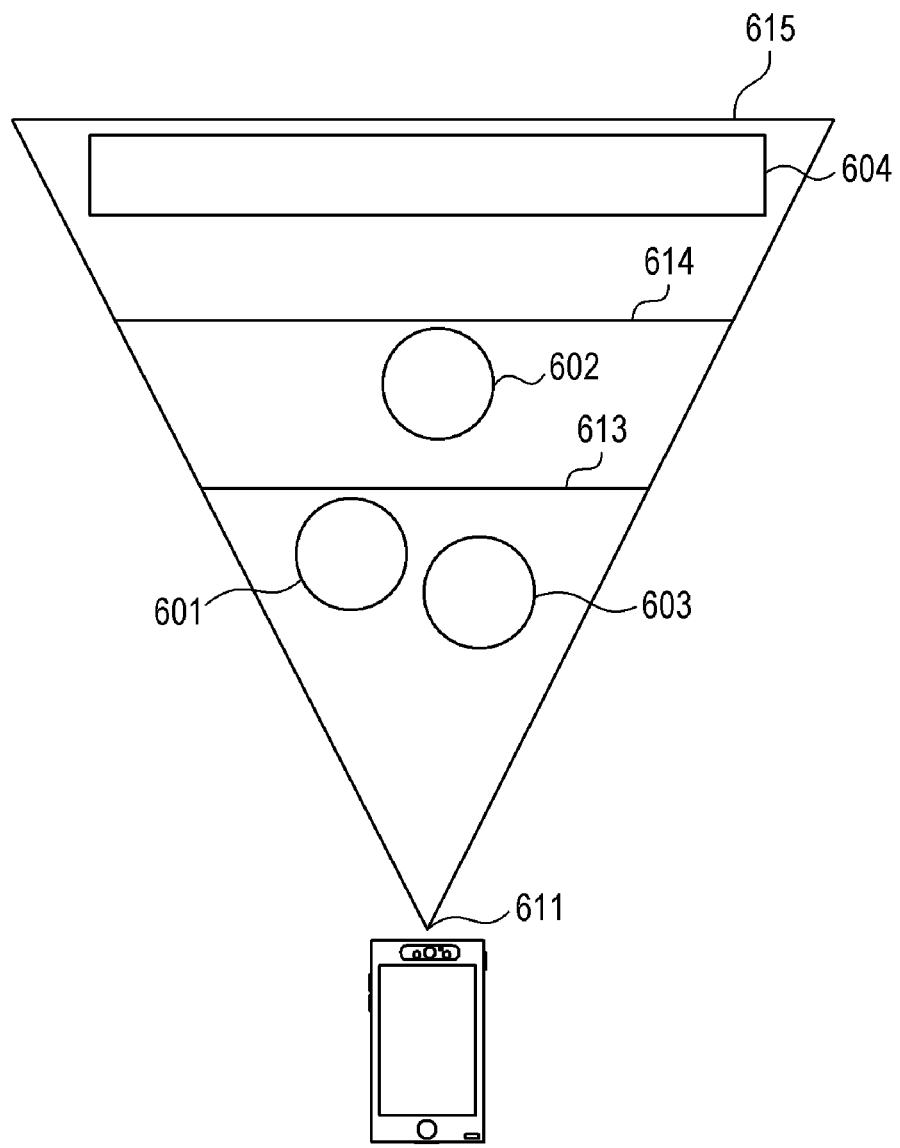
FIG. 6 is a view showing an example of a positional relationship between the smartphone according to Embodiment 1 and each object.

FIG. 6 is a view showing an example of a positional relationship between the smartphone 100 and each object. The depth range indicated by the depth map 502 in FIG. 5 is the range from a position 611 of the smartphone 100 to the deepest position 615. An object 601 and an object 603 included in the depth range from the position 611 of the smartphone 100 to a position 613 correspond to the object 511 and the object 513 in FIG. 5, respectively. An object 602 included in the depth range from the position 613 to a position 614 corresponds to the object 512 in FIG. 5, and an object 604 included in the depth range from the position 614 to the position 615 corresponds to the object 514 in FIG. 5.

The depth range (set range) indicated by the boundary adjustment sliders 503 and 505 (the set range bar 504) in FIG. 5 is the depth range from the position 611 to the position 613. Accordingly, the depth range (set range) in which the objects 601 and 603 (the objects 511 and 513 in FIG. 5) present before (on the side of the smartphone 100) the position 613 are the main objects is set. That is, the depth range of the blurring processing is set such that the blurring processing is not performed on the area of the objects 601 and 603 in the captured image.

Returning to the description of FIG. 4, in S404, the controller 14 determines whether or not a non-blurring range is changed by operating the blur adjustment UI. The non-blurring range is the depth range to which the blurring processing is not applied, and is the depth range (set range) indicated by the boundary adjustment sliders 503 and 505 (the set range bar 504) in FIG. 5. The processing proceeds to S405 in the case where the non-blurring range is not changed, and the processing proceeds to S406 in the case where the non-blurring range is changed.

In S405, the controller 14 generates a blur intensity map based on the non-blurring range which is not changed. In the case where the non-blurring range is not changed even once and the processing in S405 is performed, the blur intensity map is generated based on a default non-blurring range. In the case where the non-blurring range is changed and then the processing in S405 is performed without additionally performing the change of the non-blurring range, the blur intensity map is generated based on the non-blurring range after the immediately preceding change. The blur intensity map is the map indicating blur intensity (intensity of the blurring processing; a degree of blurring) of each area in the captured image. In Embodiment 1, the blur intensity map is generated such that the blur intensity is low in an area which corresponds to the non-blurring range, and the blur intensity is high in an area which does not correspond to the non-blurring range.

In S406, the controller 14 generates the blur intensity map based on the non-blurring range after the change.

Figure 7A:
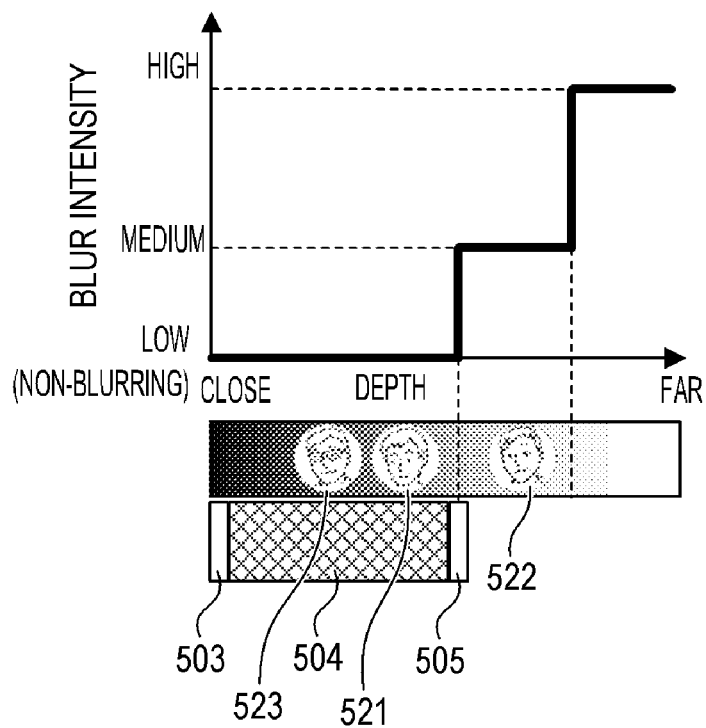
FIGS. 7A and 7B are views showing an example of a method for generating a blur intensity map according to Embodiment 1.
Figure 7B:
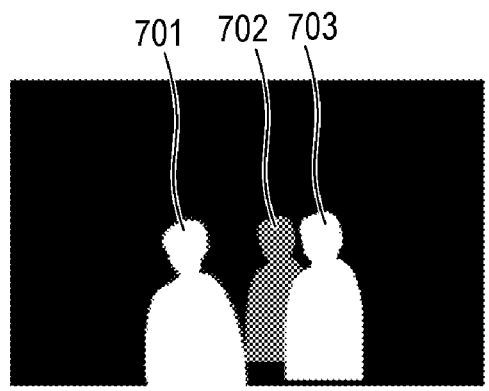

FIGS. 7A and 7B are views showing an example of the processing in S405. Specifically, FIGS. 7A and 7B show a method for generating the blur intensity map based on the default non-blurring range. FIG. 7A shows a correspondence between the depth (the distance from the smartphone 100) and the blur intensity by using a graph. The horizontal axis of the graph in FIG. 7A indicates the depth which is increased toward the right in the graph, and the vertical axis of the graph in FIG. 7A indicates the blur intensity which is increased toward the upper side in the graph. Further, FIG. 7A shows the depth map, the object icon, and the set range bar in association with the graph. FIG. 7B shows the blur intensity map. FIG. 7B shows the blur intensity such that the blur intensity map becomes darker as the blur intensity becomes higher. Herein, it is assumed that the captured image is the same as the image displayed in the area 501 in FIG. 5. Further, it is assumed that, as shown in FIG. 7A, the default set range bar is the same as the set range bar 504 in FIG. 5. In the depth range (non-blurring range) indicated by the set range bar 504, the objects 511 and 513 corresponding to the object icons 521 and 523 are present, but the object 512 corresponding to the object icon 522 is not present.

As shown in FIG. 7A, in the case of the set range bar 504, the blur intensity is set to be low (non-blurring) at the depth of the objects 511 and 513 corresponding to the object icons 521 and 523. The blur intensity is set to be medium at the depth of the object 512 corresponding to the object icon 522. In addition, the blur intensity is set to be high at a larger depth (the depth of the object 514 and the like). As a result, the blur intensity map in FIG. 7B is generated. Areas 701 and 703 in FIG. 7B are the areas of the objects 511 and 513, and the blur intensity is set to be low in the areas 701 and 703. An area 702 is the area of the object 512, and the blur intensity is set to be medium in the area 702. Further, in the remaining area, the blur intensity is set to be high.

Figure 8A:
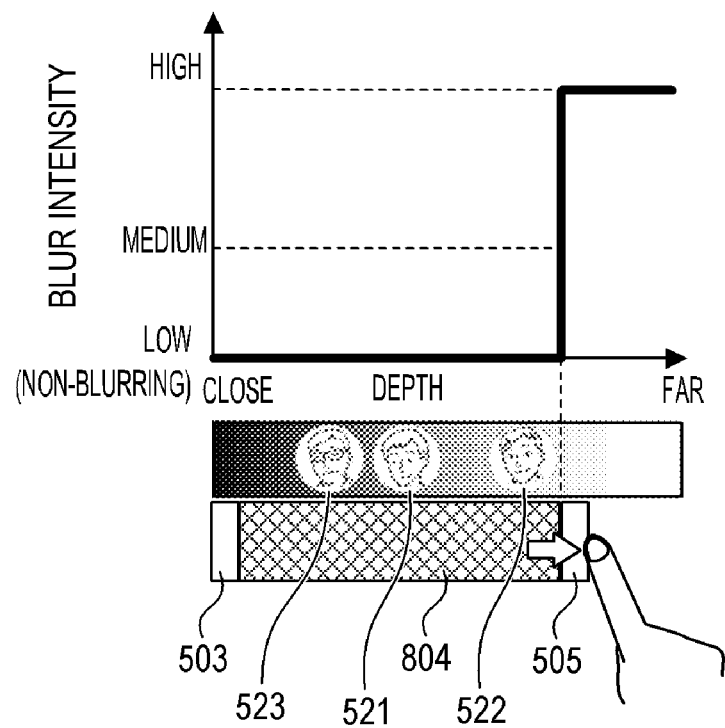
FIGS. 8A and 8B are views showing an example of the method for generating the blur intensity map according to Embodiment 1.
Figure 8B:
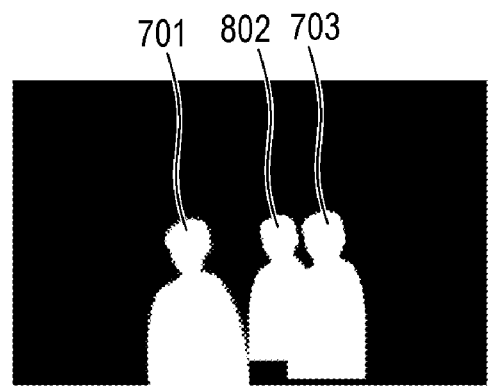

FIGS. 8A and 8B are views showing an example of the processing in S406. Similarly to FIG. 7A, FIG. 8A shows the graph (the correspondence between the depth and the blur intensity), the depth map, the object icon, and the set range bar. Similarly to FIG. 7B, FIG. 8B shows the blur intensity map. Herein, it is assumed that the captured image is the same as the image displayed in the area 501 in FIG. 5. Further, it is assumed that, as shown in FIG. 8A, the set range bar (non-blurring range) is enlarged from the set range bar 504 in FIG. 5 to a set range bar 804. In the depth range (non-blurring range) indicated by the set range bar 804, not only the objects 511 and 513 corresponding to the object icons 521 and 523 but also the object 512 corresponding to the object icon 522 is present.

As shown in FIG. 8A, in the case of the set range bar 804, the blur intensity is set to be low (non-blurring) at the depth of the objects 511 and 513 corresponding to the object icons 521 and 523. The blur intensity is set to be low also at the depth of the object 512 corresponding to the object icon 522. In addition, the blur intensity is set to be high at a larger depth (the depth of the object 514 or the like). As a result, the blur intensity map in FIG. 8B is generated. Similarly to FIG. 7A, the blur intensity is set to be low in the areas 701 and 703 of the objects 511 and 513. Unlike FIG. 7A, the blur intensity is set to be low also in an area 802 of the object 512. Similarly to FIG. 7A, the blur intensity is set to be high in the remaining area.

Note that each of FIGS. 7A and 8A shows an example in which the blur intensity discontinuously (stepwise) increases in response to a continuous increase of the depth, but the blur intensity may continuously increase in response to the continuous increase of the depth.

Returning to the description of FIG. 4, in S407, the controller 14 determines whether or not the shutter button of the smartphone 100 has been pressed. The processing proceeds to S408 in the case where the shutter button has been pressed, and the processing proceeds to S402 in the case where the shutter button has not been pressed.

In S408, the controller 14 starts main exposure processing for capturing the image to be recorded in the storage 15. In S409, the controller 14 ends the main exposure processing, and records the captured image in the storage 15. In S410, the controller 14 performs the blurring processing using the blur intensity map generated in S405 or S406 on the image recorded in S409. Note that S409 and S410 may be inter-changed, the blurring processing may be performed on the captured image, and the image having been subjected to the blurring processing may be recorded.

In the blurring processing, for example, filtering processing with the blur intensity shown in the blur intensity map is performed. The blur intensity of the filtering processing is changed by changing, e.g., the filter size of a smoothing filter used in the filtering processing. FIG. 9A shows the smoothing filter having coefficients in three rows and three columns (filter coefficients) as an example of the smoothing filter of medium blur intensity. FIG. 9B shows the smoothing filter having coefficients in five rows and five columns (filter coefficients) as an example of the smoothing filter of high blur intensity. The smoothing filter in FIG. 9A or the smoothing filter in FIG. 9B is selected according to the blur intensity indicated by the blur intensity map for each area in the captured image, and the filtering processing which uses the selected smoothing filter is performed. Herein, it is assumed that the filtering processing is not performed on the area having low blur intensity. With this, it is possible to add a blur corresponding to the blur intensity indicated by the blur intensity map to the captured image. In the filtering processing, for example, according to the following Formula 1, a pixel value I (x, y) of a position in the captured image (a position in a horizontal direction, a position in a vertical direction)=(x, y) is converted to a pixel value I' (x, y). In Formula 1, a variable m is a filter size in the vertical direction (the number of rows of the filter coefficients), a variable n is a filter size in the horizontal direction (the number of columns of the filter coefficients), and a variable h (i, j) is the filter coefficient in the i-th row and the j-th column.

[Math. 1]

$$I'(x,y)=\Sigma_{i=0,j=0}^{m,n} h(i,j)I(x-i,y-j) \qquad \text{(Formula 1)}$$

FIG. 10A shows an example of a result obtained by performing the blurring processing which uses the blur intensity map in FIG. 7B on the captured image (the image displayed in the area 501 in FIG. 5). FIG. 10B shows an example of a result obtained by performing the blurring processing which uses the blur intensity map in FIG. 8B on the captured image (the image displayed in the area 501 in FIG. 5). Each of an object 1001 in FIG. 10A and an object 1002 in FIG. 10B corresponds to the object 512 in FIG. 5, but the blur intensity of the object 1001 is different from that of the object 1002. The blur intensity in the area 702 (the area of the object 512) is set to be medium in FIG. 7B, and hence the object 1001 in FIG. 10A is blurred with the blur intensity=medium. On the other hand, the blur intensity in the area 802 (the area of the object 512) is set to be low in FIG. 8B, and hence the object 1002 in FIG. 10B is not blurred. Thus, by adjusting the blur intensity map, it is possible to adjust the blur intensities of the objects individually.

Returning to the description of FIG. 4, in S411, the controller 14 determines whether or not a photographing end instruction (photographing end operation) has been issued. The photographing processing is ended in the case where the photographing end instruction has been issued, and the photographing processing proceeds to S402 for the next photographing in the case where the photographing end instruction has not been issued. For example, in the case where the home button or the power button is pressed, the controller 14 determines that the photographing end instruction has been issued, and ends the photographing processing.

As described thus far, according to Embodiment 1, the user can easily specify the desired area of the object by using the blur adjustment UI such that the desired blurring processing (desired processing; desired control) is executed.

Note that the user may be able to change imaging parameters (camera setting) of exposure (an aperture value and a shutter speed) or the like when the non-blurring range (set range) is specified. It is possible to adjust not only the non-blurring range (the depth range used as the range of the main object) but also the exposure before photographing, whereby it becomes possible to obtain a more preferable image.

In addition, although the non-blurring range (set range) may be set by moving the boundary adjustment slider by an amount equal to its operation amount, processing (control) which assists the specification of the non-blurring range may also be performed by using the positional information of the object. With this, the specification of the non-blurring range is facilitated (an improvement in operability).

For example, an operation for enlarging the set range in a direction of presence of the object may be received as an operation for enlarging the set range to a range including the object even when its operation amount is smaller than an operation amount of the operation for enlarging the set range to the range including the object. That is, in the case where the controller 14 detects the movement of the boundary adjustment slider in a direction (enlargement direction) in which the set range is enlarged, the controller 14 may automatically enlarge the set range such that the object which is present on the side of the enlargement direction relative to the set range before the enlargement and is closest to the set range before the enlargement is included in the set range.

Figure 11A:
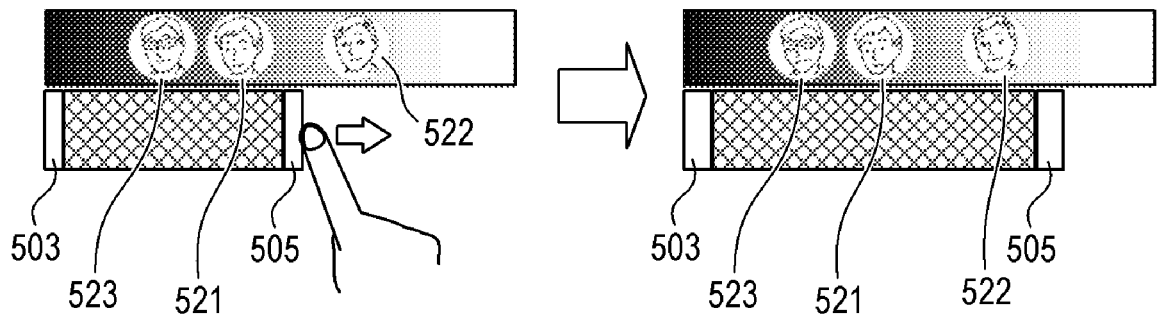
FIGS. 11A to 11C are each a view showing a method for specifying a set range which is a modification of Embodiment 1.

FIG. 11A shows an example in which the set range is enlarged by moving the boundary adjustment slider. The left side in FIG. 11A shows a state before the enlargement, and the right side in FIG. 11A shows a state after the enlargement. The set range before the enlargement includes the object icons 521 and 523, but does not include the object icon 522. Herein, it is assumed that, as shown on the left side in FIG. 11A, the user has moved the boundary adjustment slider 505 to the right so as to enlarge the set range. When the controller 14 detects this operation (the movement of the boundary adjustment slider 505), the controller 14 detects (searches for) the object which is present on the side of the enlargement direction relative to the set range before the enlargement and is closest to the set range before the enlargement by using the positional information of the object. Herein, the enlargement direction is a direction which corresponds to a movement direction of the boundary adjustment slider 505 and is a direction toward a far side from a near side. Then, the object 512 (FIG. 5) corresponding to the object icon 522 is detected. Thereafter, the controller 14 automatically causes the boundary adjustment slider 505 to move (jump) to enlarge the set range such that the detected object 512 (the object icon 522) is included in the set range (the right side in FIG. 11A).

Similarly, in the case where the controller 14 detects the movement of the boundary adjustment slider in a direction in which the set range is reduced, the controller 14 may automatically reduce the set range such that the object which is included in the set range and is closest to the reduction side of the set range is excluded.

An operation for specifying the object icon may be received as an operation for enlarging the set range to the range including the object icon (the object corresponding to the object icon) such that the set range can be specified more intuitively.

Figure 11B:
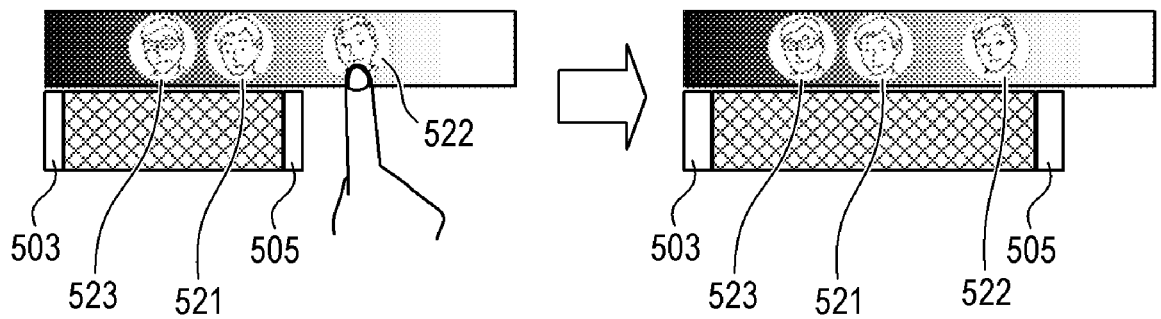

FIG. 11B shows an example in which the set range is enlarged by specifying the object icon. The left side in FIG. 11B shows a state before the enlargement, and the right side in FIG. 11B shows a state after the enlargement. The set range before the enlargement includes the object icons 521 and 523, but does not include the object icon 522. Herein, it is assumed that, as shown on the left side in FIG. 11B, the user has touched the object icon 522 such that the object icon 522 is included in the set range. When the controller 14 detects this operation (the touch on the object icon 522), the controller 14 automatically causes the boundary adjustment slider 505 to move (jump) to enlarge the set range such that the object icon 522 is included in the set range (the right side in FIG. 11B).

Similarly, an operation for specifying the object icon included in the set range may be received as an operation for reducing the set range to the range in which the object icon is excluded.

Although an example in which the object icon is automatically displayed from the start when the blur adjustment UI is displayed has been described, the object icon may not be displayed from the start. For example, the object icon of the object may be displayed in response to an operation for specifying the object on the image which is captured and displayed. In this case, the set range may be automatically enlarged to the range which includes the specified object (displayed object icon).

Figure 11C:
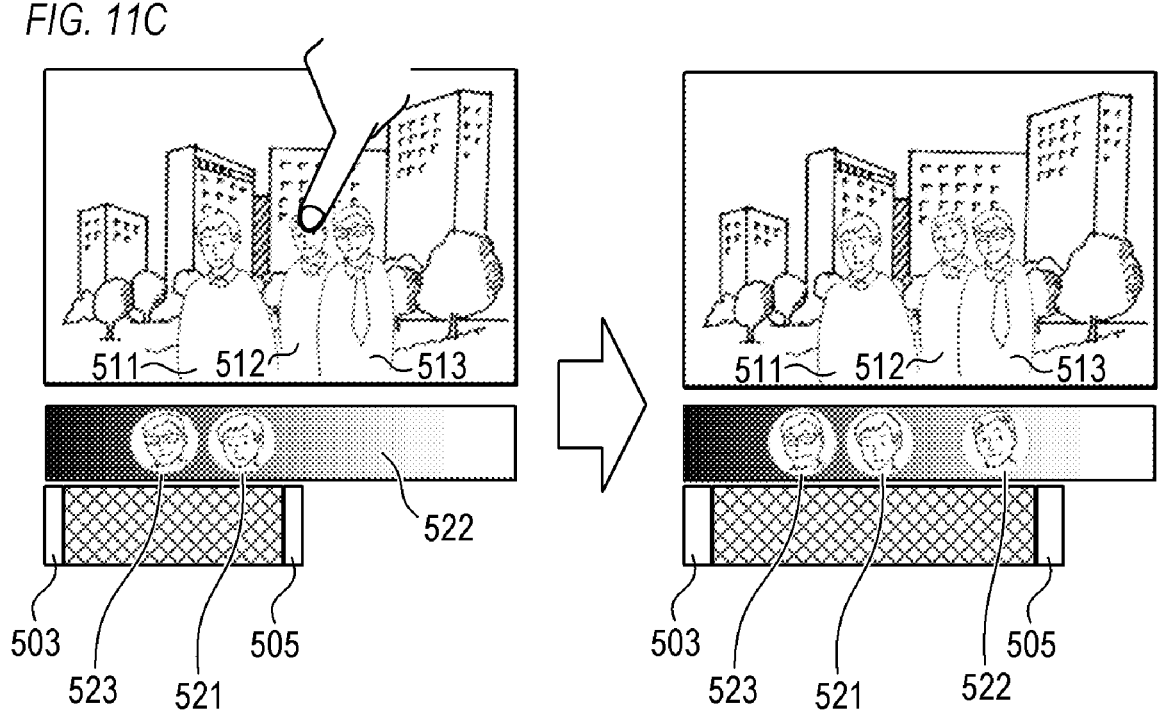

FIG. 11C shows an example in which the set range is enlarged by specifying the object on the captured image. The left side in FIG. 11C shows a state before the enlargement, and the right side in FIG. 11C shows a state after the enlargement. Before the enlargement, the object icons 521 and 523 corresponding to the objects 511 and 513 are displayed, but the object icon 522 corresponding to the object 512 is not displayed. In addition, as the set range, the range including the object icons 521 and 523 is set. Herein, it is assumed that, as shown on the left side in FIG. 11C, the user has touched the object 512 on the captured image such that the object 512 (the object icon 522) is included in the set range. When the controller 14 detects this operation (the touch on the object 512), the controller 14 performs object detection processing in an area including the position of the touch to detect the object 512. Subsequently, the controller 14 displays the object icon 522 corresponding to the object 512 at the position based on the positional information of the object 512 (the right side in FIG. 11C). Further, the controller 14 automatically causes the boundary adjustment slider 505 to move (jump) to enlarge the set range such that the object icon 522 is included in the set range (the right side in FIG. 11C).

Although an example in which the non-blurring range is specified as the set range, i.e., an example in which the blurring processing is not performed on the area corresponding to the set range has been described, the specification is not limited thereto. For example, the user may specify a blurring range (a depth range to which the blurring processing is applied) as the set range. That is, the blurring processing may be performed on the area corresponding to the set range, and the blurring processing may not be performed on the area which does not correspond to the set range.

In addition, the operation for specifying the set range does not need to be the touch operation on the touch screen. For example, the set range may be specified by an operation performed on a physical button provided in the smartphone (electronic apparatus) or an operation which uses an external apparatus such as a mouse. It is only required that the electronic apparatus to which the present invention is applied has the function of controlling the display of the display and the function of executing predetermined processing based on the set range, and the electronic apparatus does not need to include the display or the camera. At least either the display or the camera may be an external apparatus of the electronic apparatus to which the present invention is applied.

Embodiment 2

Hereinbelow, Embodiment 2 of the present invention will be described. In Embodiment 2, an example in which the non-blurring range is adjusted after photographing and the blurring processing is performed will be described. Note that the outer appearance and the configuration of the smartphone according to Embodiment 2 are the same as those of the smartphone in Embodiment 1 (FIGS. 1A, 1B, and 2), and hence the description thereof will be omitted.

Figure 12:
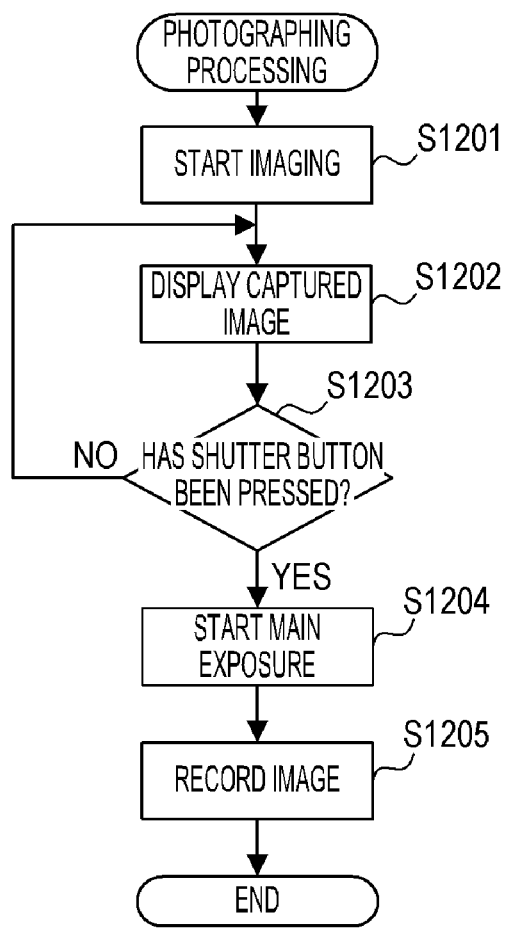
FIG. 12 is a flowchart of photographing processing according to Embodiment 2.

FIG. 12 is a flowchart showing the detail of photographing processing (photographing processing which does not include the image editing processing) performed in the smartphone 100 according to Embodiment 2. The controller 14 loads the control program 15A stored in the storage 15 into the system memory 16 and executes the control program 15A, and the above processing is thereby implemented. For example, when the tap on, among a plurality of the icons 306 in FIG. 3, the icon 306 associated with the function of the camera (camera function) is performed, the processing in FIG. 12 is started.

In S1201, similarly to S401 in FIG. 4, the controller 14 activates the camera function, and starts imaging by the rear camera 108. Further, similarly to S401 in FIG. 4, the controller 14 starts the acquisition of the depth information of the captured image and the positional information of the object. In Embodiment 2, the controller 14 acquires, as the positional information of the object, information indicating not only the position in the depth direction but also a position in a specific direction perpendicular to the depth direction. The specific direction is not particularly limited and, in Embodiment 2, it is assumed that the specific direction is the horizontal direction (left-to-right direction) of the captured image.

In S1202, similarly to S402, the controller 14 displays the image captured by the rear camera 108 in the liquid crystal display 102A.

In S1203, similarly to S407, the controller 14 determines whether or not the shutter button of the smartphone 100 has been pressed. The processing proceeds to S1204 in the case where the shutter button has been pressed, and the processing proceeds to S1202 in the case where the shutter button has not been pressed.

In S1204, similarly to S408, the controller 14 starts the main exposure processing for capturing the image to be recorded in the storage 15. In S1205, similarly to S409, the controller 14 ends the main exposure processing and records the captured image in the storage 15. At this point, the depth information and the positional information of the object are also recorded in the storage 15 in association with the captured image.

Figure 13:
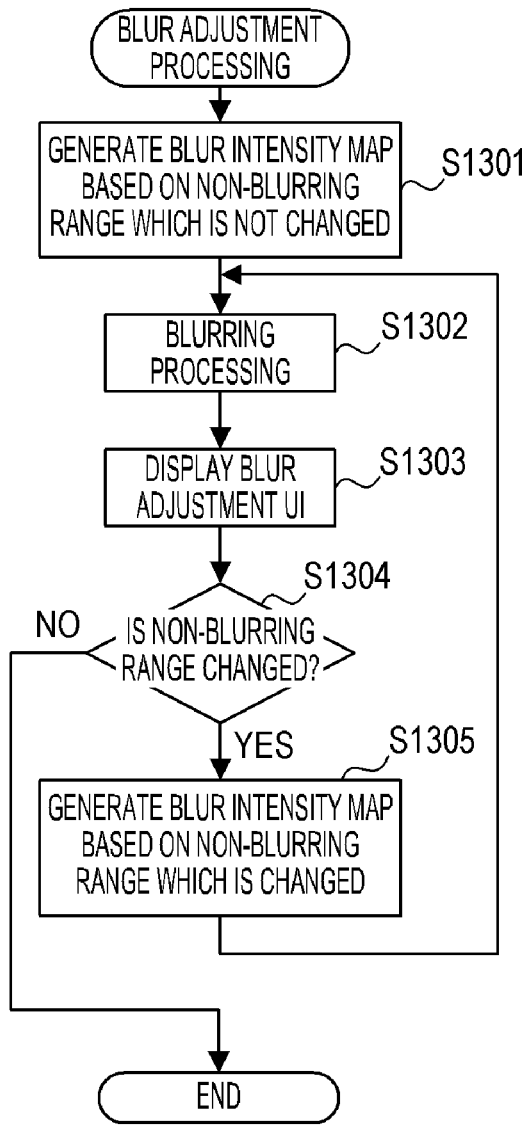
FIG. 13 is a flowchart of blur adjustment processing according to Embodiment 2.

FIG. 13 is a flowchart showing the detail of blur adjustment processing (image editing processing) performed in the smartphone 100. The controller 14 loads the control program 15A stored in the storage 15 into the system memory 16 and executes the control program 15A, and the above processing is thereby implemented. For example, when the user taps on, among a plurality of the icons 306 in FIG. 3, the icon 306 corresponding to a picture function (a browse/editing function which performs browse and editing of the taken (recorded) image), a screen of the function (browse/editing screen) is displayed in the liquid crystal display 102A. Then, when the user selects a processing-target (blur adjustment processing-target) image from among a plurality of the taken (recorded) images, the selected image is displayed on the browse/editing screen. Thereafter, when the user issues an instruction (operation) to execute the blur adjustment processing, the processing in FIG. 13 is started.

In S1301, the controller 14 reads the positional information of the processing-target image (the positional information of the object acquired by the photographing processing in FIG. 12) from the storage 15. Subsequently, similarly to S405 in FIG. 4, the controller 14 generates the blur intensity map based on the read positional information and the non-blurring range which is not changed. The non-blurring range which is not changed is, e.g., a default blurring range.

In S1302, similarly to S410, the controller 14 performs the blurring processing which uses the blur intensity map generated in S1301 (or S1305 described later) on the processing-target image. With this, the image (processing-target image) displayed on the browse/editing screen is replaced with the image having been subjected to the blurring processing.

In S1303, similarly to S403, the controller 14 displays the blur adjustment UI in the liquid crystal display 102A, and urges the user to adjust the non-blurring range. Note that, in Embodiment 2, the blur adjustment UI is different from that in Embodiment 1 (the detail thereof will be described later).

In S1304, similarly to S404, the controller 14 determines whether or not the non-blurring range is changed by operating the blur adjustment UI. The blur adjustment processing is ended in the case where the non-blurring range is not changed, and the blur adjustment processing proceeds to S1305 in the case where the non-blurring range is changed.

In S1305, similarly to S406, the controller 14 generates the blur intensity map based on the non-blurring range after the change.

FIG. 14A is a view showing an example of a display of a processing-target image 1400 and a blur adjustment UI (depth map) 1420. The blur adjustment UI 1420 is an item (graphic) displayed based on the depth information and the positional information of the object. The length of the blur adjustment UI 1420 in a longitudinal direction corresponds to the depth range in the processing-target image, and the length of the blur adjustment UI 1420 in the lateral direction corresponds to a horizontal range (a range in a horizontal direction; a range in a specific direction perpendicular to the depth direction) in the captured image. The blur adjustment UI 1420 can be said to be a graph having the vertical axis indicating the position in the depth direction and the horizontal axis indicating the position in the horizontal direction.

When the blur adjustment UI 1420 is displayed, similarly to Embodiment 1, based on the positional information of the object, the object icon is displayed at a position corresponding to the positional information in the blur adjustment UI 1420. In FIG. 14A, object icons 1411 to 1413 corresponding to objects 1401 to 1403 are displayed.

The user can specify a range including not only the range in the depth direction but also the range in the horizontal direction as the non-blurring range by specifying at least part of the blur adjustment UI 1420 as the non-blurring range (set range). In FIG. 14A, a non-blurring range 1461 (default) is set. The object icon 1413 is not included in the non-blurring range 1461, and hence the object 1403 corresponding to the object icon 1413 is blurred by the blurring processing in the image 1400.

FIG. 14B shows an example of a display after the non-blurring range is updated. Specifically, FIG. 14B shows an example of a display after the user has performed the operation such as the drag, the swipe, or the slide in a direction of an arrow 1441 such that the object 1403 corresponding to the object icon 1413 is not blurred. In FIG. 14B, the non-blurring range is enlarged from the non-blurring range 1461 in FIG. 14A to a non-blurring range 1431. When the controller 14 detects such an operation, the controller 14 updates the blur intensity map based on the non-blurring range 1431, and performs the blurring processing again. As a result, the processing-target image is updated from the image 1400 in FIG. 14A to an image 1410. The object icon 1413 is included in the non-blurring range 1431, and hence a blur of the object 1403 corresponding to the object icon 1413 is removed in the image 1410.

As described thus far, according to Embodiment 2, by using the two-dimensional depth map (blur adjustment UI), the user can specify the non-blurring range more easily and more intuitively than in Embodiment 1 (an improvement in operability). Further, it is possible to specify the range in the specific direction perpendicular to the depth direction, and hence it is possible to allow a plurality of areas having the same position in the depth direction to have different blur intensities, and it is possible to obtain an image which is more preferable than that in Embodiment 1 (an increase in the accuracy of processing (control) based on the set range).

Although an example in which the photographing processing and the blur adjustment processing are individually executed has been described, the present invention is not limited thereto. For example, after the processing in S1205 in FIG. 12, a preview screen of the taken image may be automatically displayed. In addition, the blur adjustment processing in FIG. 13 may be automatically performed such that the blur adjustment UI is displayed on the preview screen.

In addition, although an example in which the blur adjustment processing is performed after the photographing has been described, the blur adjustment processing may also be performed before the photographing, as in Embodiment 1. The blur adjustment processing may also be performed before and after the photographing. Note that, before the photographing, it is preferable that the photographing can be performed quickly, and hence, by using the blur adjustment UI in Embodiment 1 before the photographing, it is preferable to reduce an arithmetic calculation amount (processing load) required for the controller 14 to a level lower than a level in the case where the blur adjustment UI in Embodiment 2 is used. Then, after the photographing, in order to allow a more preferable instruction or processing, it is preferable to use the blur adjustment UI in Embodiment 2. The same blur adjustment UI may also be used before and after the photographing.

Further, the set range is not limited to the non-blurring range, and the predetermined processing based on the set range is not limited to the blurring processing. For example, the predetermined processing may include area extraction processing for extracting an area corresponding to the set range from an image.

Figure 15A:
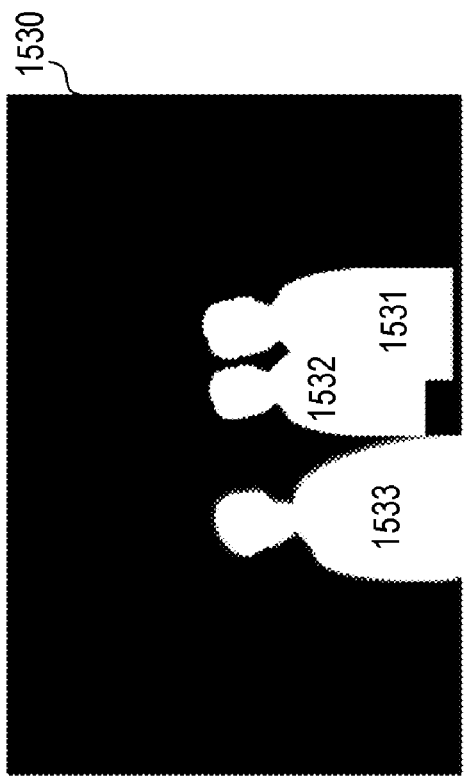
FIGS. 15A to 15D are views showing an example of area extraction processing which is a modification of Embodiment 2.
Figure 15B:
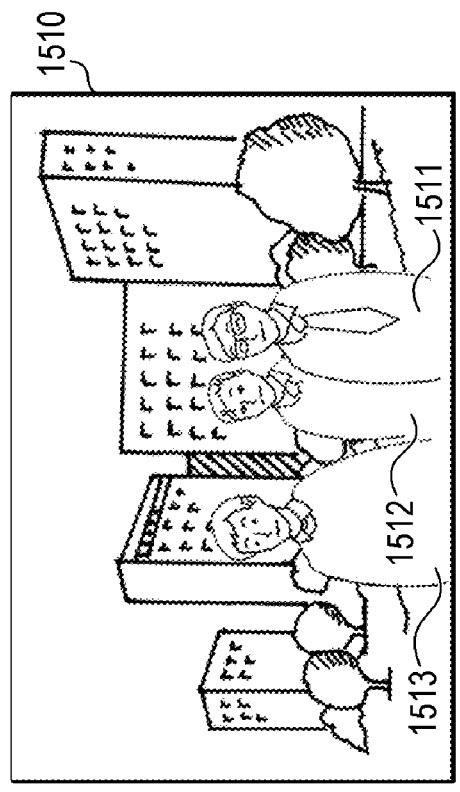

FIGS. 15A to 15D are views showing an example of the area extraction processing. FIG. 15A shows a taken image 1510, and the image 1510 includes objects 1511 to 1513. FIG. 15B shows a range specification UI 1520 for specifying the set range. The range specification UI 1520 is an item (graphic) similar to the blur adjustment UI in Embodiment 2. FIG. 15B also shows object icons 1521 to 1523 corresponding to the objects 1511 to 1513.

Figure 15C:
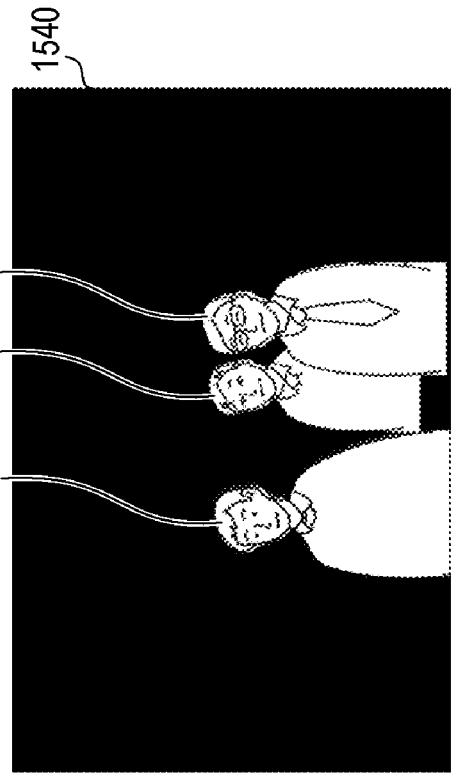
Figure 15D:
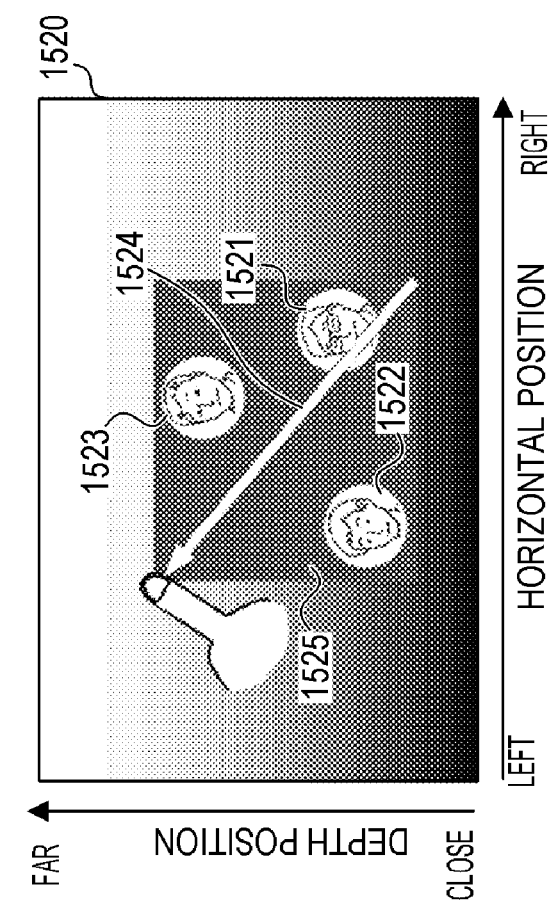

In FIG. 15B, by the drag from a starting point of an arrow 1524 to an ending point thereof, a set range 1525 including the object icons 1521 to 1523 is specified. Based on the set range 1525, the controller 14 generates area information indicating areas corresponding to the set range 1525 in the image 1510. FIG. 15C shows generated area information 1530. Areas 1531 to 1533 indicated by the area information 1530 correspond to the objects 1511 to 1513. Thereafter, the controller 14 extracts (cuts out) images (area extraction information) of the areas 1531 to 1533 indicated by the area information 1530 from the image 1510. FIG. 15D shows an extracted image 1540. The image 1540 includes only the objects 1511 to 1513.

A result of the above-described extraction can be used in various image editing processing such as lighting adjustment for adjusting brightness of the image. For example, the controller 14 performs the lighting adjustment on the image 1540 such that the brightnesses of the objects 1511 to 1513 become uniform. The lighting adjustment includes, e.g., processing for multiplying a pixel value by a gain value. Subsequently, the controller 14 replaces the objects 1511 to 1513 in the image 1510 with the objects 1511 to 1513 having been subjected to the lighting adjustment. With this, it is possible to add the effect of the lighting adjustment for making the brightnesses of the objects 1511 to 1513 uniform to the image 1510. Thus, by using the result of the extraction, it becomes possible to perform the lighting adjustment for adjusting the brightness of the area corresponding to the set range. That is, the predetermined processing based on the set range may include the lighting adjustment for adjusting the brightness of the area corresponding to the set range.

In addition, the predetermined processing based on the set range is not limited to the image processing. For example, the predetermined processing may include processing for determining imaging parameters of a digital single-lens (reflex) camera or the like based on the set range. For example, the controller 14 may set (change) the aperture value of a lens such that the depth range corresponding to the set range is included in depth of field. The controller 14 may set an area (object) corresponding to a specified range as an area for autoexposure (AE) processing and auto white balance (AWB) processing. With this, it becomes possible to capture (take) a preferable image such as an image in which an object on which attention of the user is focused is expressed with high image quality.

Although the present invention has been described in detail based on its preferred embodiments, the present invention is not limited to the specific embodiments, and various forms within the scope that does not depart from the gist of the invention are also included in the present invention. Further, each embodiment described above is only illustrative of an exemplary embodiment of the present invention, and the embodiments may also be combined with each other appropriately.

Note that the above various control operations described as the control operations performed by the controller 14 may be performed by one piece of hardware, or the control of the entire device may be performed by causing a plurality of pieces of hardware (e.g., a plurality of processors or circuits) to share processing.

According to the present disclosure, the user can easily specify the desired area of the object such that the desired processing (control) is executed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-041760, filed on Mar. 11, 2020, which is hereby incorporated by reference herein in its entirety.

What is claimed is:

1. An electronic apparatus comprising at least one memory and at least one processor which function as:
   an acquisition unit configured to acquire positional information indicating a position of an object in a captured image;
   a display control unit configured to perform control such that an item having a length in a first direction, which corresponds to a range in a depth direction in the image, is displayed in a display, and a graphic indicating presence of the object is displayed in association with a position corresponding to the positional information in the item;
   a reception unit configured to be able to receive an operation of specifying a set range which is at least part of the item; and
   a processing unit configured to perform predetermined processing based on the set range;
   wherein the reception unit is able to receive an operation of enlarging the set range in a direction of presence of the object as an operation of enlarging the set range to a range including the object even when an operation amount of the operation of enlarging the set range in the direction of presence of the object is smaller than an operation amount of the operation of enlarging the set range to the range including the object.

2. The electronic apparatus according to claim 1, wherein in the item, at least one of luminance and color differs according to a position in the first direction.

3. The electronic apparatus according to claim 1, wherein the display control unit performs control such that the graphic is displayed at the position corresponding to the positional information in the item.

4. The electronic apparatus according to claim 1, wherein the object is a person, and the graphic is a face image.

5. The electronic apparatus according to claim 1, wherein a length of the item in a second direction corresponds to a range in a specific direction perpendicular to the depth direction in the image.

6. The electronic apparatus according to claim 1, wherein the reception unit is able to receive an operation of specifying the graphic as an operation of enlarging the set range to a range including the object corresponding to the graphic.

7. The electronic apparatus according to claim 1, wherein
   the display control unit further performs control such that the image is displayed on the display, and
   the reception unit is able to receive an operation of specifying the object on the image as an operation of enlarging the set range to a range including the object.

8. The electronic apparatus according to claim 1, wherein the predetermined processing includes processing for blurring an area which does not correspond to the set range in the image.

9. The electronic apparatus according to claim 1, wherein the predetermined processing includes processing for extracting an area which corresponds to the set range from the image.

10. The electronic apparatus according to claim 1, wherein the predetermined processing includes processing for adjusting brightness of an area which corresponds to the set range in the image.

11. The electronic apparatus according to claim 1, wherein the predetermined processing includes processing for determining an imaging parameter on a basis of the set range.

12. A control method of an electronic apparatus, comprising:
    acquiring positional information indicating a position of an object in a captured image;
    performing control such that an item having a length in a first direction, which corresponds to a range in a depth direction in the image, is displayed in a display, and a graphic indicating presence of the object is displayed in association with a position corresponding to the positional information in the item;
    receiving an operation of specifying a set range which is at least part of the item; and
    performing predetermined processing based on the set range;
    wherein the receiving step is able to receive an operation of enlarging the set range in a direction of presence of the object as an operation of enlarging the set range to a range including the object even when an operation amount of the operation of enlarging the set range in the direction of presence of the object is smaller than an operation amount of the operation of enlarging the set range to the range including the object.

13. A non-transitory computer readable medium that stores a program, wherein the program causes a computer to execute a control method of an electronic apparatus, the control method comprising:

acquiring positional information indicating a position of an object in a captured image;

performing control such that an item having a length in a first direction, which corresponds to a range in a depth direction in the image, is displayed in a display, and a graphic indicating presence of the object is displayed in association with a position corresponding to the positional information in the item;

receiving an operation of specifying a set range which is at least part of the item; and performing predetermined processing based on the set range;

wherein the receiving step is able to receive an operation of enlarging the set range in a direction of presence of the object as an operation of enlarging the set range to a range including the object even when an operation amount of the operation of enlarging the set range in the direction of presence of the object is smaller than an operation amount of the operation of enlarging the set range to the range including the object.

* * * * *